US008288004B2

(12) United States Patent
Moorlag et al.

(10) Patent No.: US 8,288,004 B2
(45) Date of Patent: *Oct. 16, 2012

(54) FUSER MEMBER COATING HAVING SELF-RELEASING FLUOROPOLYMER-FLUOROCARBON LAYER

(75) Inventors: Carolyn Moorlag, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 412 days.

This patent is subject to a terminal disclaimer.

(21) Appl. No.: 12/274,988

(22) Filed: Nov. 20, 2008

(65) Prior Publication Data

US 2010/0124662 A1 May 20, 2010

(51) Int. Cl.

*B32B 25/14* (2006.01)
*B32B 27/28* (2006.01)
*G03G 15/20* (2006.01)

(52) U.S. Cl. .......................... 428/421; 428/422; 399/333

(58) Field of Classification Search ........................ None
See application file for complete search history.

(56) References Cited

U.S. PATENT DOCUMENTS

| | | | | |
|---|---|---|---|---|
| 4,257,699 | A | 3/1981 | Lentz | |
| 4,777,087 | A | 10/1988 | Heeks et al. | |
| 5,017,432 | A | 5/1991 | Eddy et al. | |
| 5,061,965 | A | 10/1991 | Ferguson et al. | |
| 5,166,031 | A | 11/1992 | Badesha et al. | |
| 5,281,506 | A | 1/1994 | Badesha et al. | |
| 5,366,772 | A | 11/1994 | Badesha et al. | |
| 5,370,931 | A | 12/1994 | Fratangelo et al. | |
| 5,501,881 | A | 3/1996 | Fuller et al. | |
| 5,512,409 | A | 4/1996 | Henry et al. | |
| 5,520,600 | A * | 5/1996 | Fukumoto | 492/56 |
| 5,729,813 | A | 3/1998 | Eddy et al. | |
| 5,945,223 | A | 8/1999 | Kuntz et al. | |
| 6,002,910 | A | 12/1999 | Eddy et al. | |
| 6,007,657 | A | 12/1999 | Eddy et al. | |
| 6,604,566 | B1 * | 8/2003 | Chen et al. | 156/555 |
| 6,678,495 | B1 * | 1/2004 | Badesha et al. | 430/124.33 |
| 7,127,205 | B2 | 10/2006 | Gervasi et al. | |
| 2006/0105177 | A1 | 5/2006 | Gervasi et al. | |
| 2006/0263536 | A1 | 11/2006 | Blair et al. | |
| 2007/0026222 | A1 | 2/2007 | Hayakawa et al. | |
| 2008/0070041 | A1 | 3/2008 | Kuntz et al. | |
| 2008/0205950 | A1 | 8/2008 | Moorlag et al. | |
| 2008/0213491 | A1 | 9/2008 | Moorlag et al. | |

OTHER PUBLICATIONS

European Patent Office, European Search Report, European Application No. 09175644.5, Feb. 5, 2010, 3 Pages.
European Patent Office, European Search Report, European Application No. 09175630.4, Feb. 5, 2010, 3 Pages.

* cited by examiner

*Primary Examiner* — Ramsey Zacharia
(74) *Attorney, Agent, or Firm* — MH2 Technology Law Group LLP

(57) ABSTRACT

A self-releasing fuser member and image apparatus having the fuser member, and wherein the fuser member includes a substrate, and thereover an outer layer having a topcoat, wherein the outer layer includes a fluoropolymer material and wherein said topcoat includes an outermost layer of fluorocarbon chains, wherein the fluorocarbon chains are bonded to said fluoropolymer material, and wherein the fuser member decreases or eliminates the need for fusing oils as it is self-releasing.

17 Claims, 3 Drawing Sheets

FUSER MEMBER COATING HAVING SELF-RELEASING FLUOROPOLYMER-FLUOROCARBON LAYER

CROSS REFERENCE TO RELATED APPLICATIONS

Attention is directed to U.S. application Ser. No. 12/274,968, filed Nov. 20, 2008, entitled, "Fuser Member Coating Having Self-Releasing Fluorocarbon Matrix Outer Layer." The subject matter of this application is hereby incorporated by reference in its entirety.

BACKGROUND

The disclosed embodiments generally relate to the field of fuser members useful in electrostatographic apparatuses. In embodiments, the outer layer of the fuser member comprises a topcoat layer comprising fluorocarbon chains bonded to an underlying layer of a fluoropolymer material. In embodiments, the fluoropolymer material comprises a fluoroelastomer that is cured via a siloxane curing system, and fluorocarbon chains in the topcoat layer are bonded to the fluoropolymer or fluoroelastomer layer via siloxane functionalities. The layered combination may be used in roller or belt applications. Processes for producing the outer layer combination are also described herein. In embodiments, the topcoat layer is self-releasing, dispensing with the need for fusing oils.

In a typical electrostatographic printing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided.

The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser roll, and accordingly it is desired to provide a fusing surface, which has a low surfaced energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One the earliest and successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks, which is incorporated herein in its entirety.

While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

Fuser and fixing rolls or belts may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

U.S. Pat. No. 7,127,205, which is hereby incorporated by reference in its entirety, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. Commonly used fluoropolymer crosslinkers are bisphenol-A and bisphenol AF that are known to react with unsaturated positions on fluoropolymer chains. The surface is then stepwise heat cured. Prior to the stepwise heat curing, ball milling is usually performed for from 2 to 24 hours.

U.S. Pat. No. 6,002,910 teaches anisotropic fillers in a fuser outer layer, and in embodiments, orienting the fillers in a radial direction, in order to increase thermal conductivity. A fluoropolymer is added as a filler and oriented.

Fuser topcoats are typically made from low surface-energy fluoropolymers such as perfluoroalkoxy, or other TEFLON®-like fluoropolymers, or fluoroelastomers such as those sold under the trademark VITON® from DuPont. These materials are expected to provide heat and wear resistance, conformability, and improved release at the fusing nip. A current issue with existing fusing materials such as VITON® fluoroelastomers is the requirement of a PDMS (polydimethylsiloxane)-based fusing oil for release of toner and other contaminants. This fusing oil results in difficulties in end uses of printed materials such as binding, lamination, or other processes requiring surface adhesion. New topcoat materials are required for low-oil or oil-less machines (machines that do not require a release agent or fuser oil) used for high performance fusing applications.

An outer coating comprising a fluoropolymer material chemically attached to a topcoat comprising semi-fluorinated or fluorinated carbon chains imparts a high degree of fluorination at the fusing surface, and in embodiments, facilitates release with the use of a minimal amount of fusing oil, or without the use of fusing oil.

The disclosure contained herein describes attempts to address one or more of the problems described above.

SUMMARY

Embodiments herein include a self-releasing fuser member comprising a substrate, and thereover, an outer layer having a topcoat, wherein the outer layer comprises a fluoropolymer and wherein the topcoat comprises fluorocarbon chains, and further wherein the fluorocarbon chains are bonded to the fluoropolymer.

Embodiments also include an oil-less image forming apparatus for forming images on a recording medium comprising a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a self-releasing fuser member for fusing the developed image to a copy substrate, wherein the self-releasing fuser member comprises a substrate, and thereover, an outer layer having a topcoat, wherein the outer layer comprises a fluoropolymer and wherein the topcoat comprises fluorocarbon chains, and further wherein the fluorocarbon chains are bonded to the fluoropolymer

DETAILED DESCRIPTION

Embodiments herein describe a fuser member coating comprising an outer layer having a topcoat, wherein the outer layer comprises a fluorinated polymer material and wherein the topcoat comprises fluorocarbon chains, some or all of which are chemically bonded to the fluorinated polymer layer. The fluorocarbon chain is semi- or fully fluorinated. Fluorocarbon chains are bonded to the fluoropolymer by reactive functionalities. In embodiments, the fluorocarbon chains are siloxane-terminated and react with fluoropolymer chains via reaction with additional siloxane functionalities of a polymer crosslinker. In embodiments, the topcoat imparts a high degree of fluorination at the fusing surface thereby facilitating release with a minimal amount of fusing oil, or without the use of fusing oil. The material may then be termed "self-releasing". This reduces or eliminates the transfer of fuser oil onto the printed substrates. Fuser oil transferred to printed substrate results in undesirable issues for subsequent applications requiring adhesion to the surface, such as lamination or book binding. The manufacturing costs of a machine including the fuser member having the outer layer described herein are also reduced in the instance of an oil-less machine as the fuser oil sump and components are not necessary.

Figure 1:
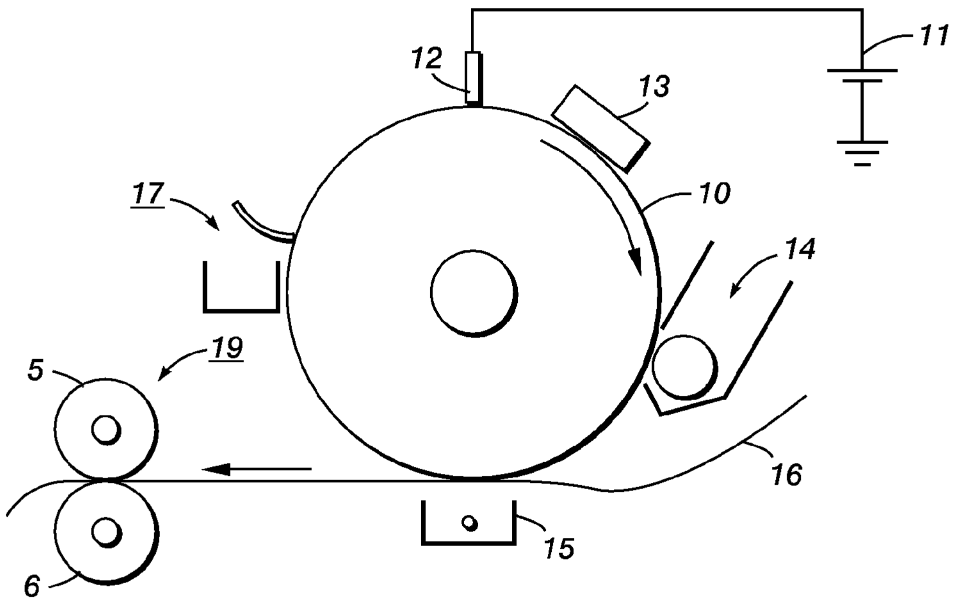
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
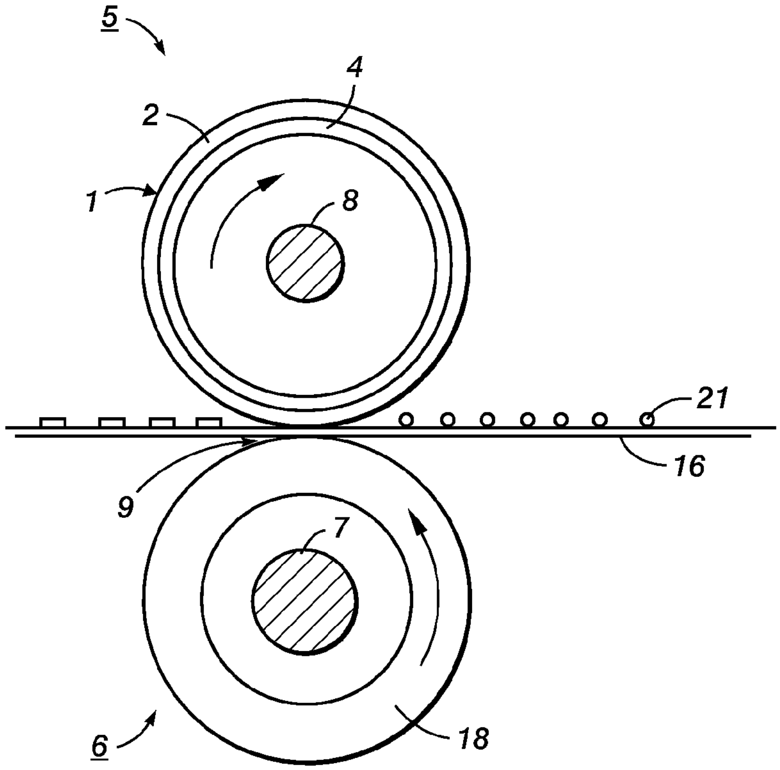
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact surface 2 of fuser roll 5. As shown in FIG. 2, the backup roll 6 has a rigid steel core 7 with a surface or layer 18 thereon.

In embodiments, the fuser system is oil-less and there is no release agent needed for fusing. No oil is applied to the fuser roller, and the release agent delivery rollers are not present in the system. However, in other embodiments, the system could possibly use a release agent.

The fusing component can be comprised of at least three different configurations. In one embodiment, the fusing component is of a two-layer configuration as shown in FIG. 2. Fuser member 5 having heating element 8, comprises substrate 4. Positioned over the substrate 4 is outer layer 2.

Figure 3:
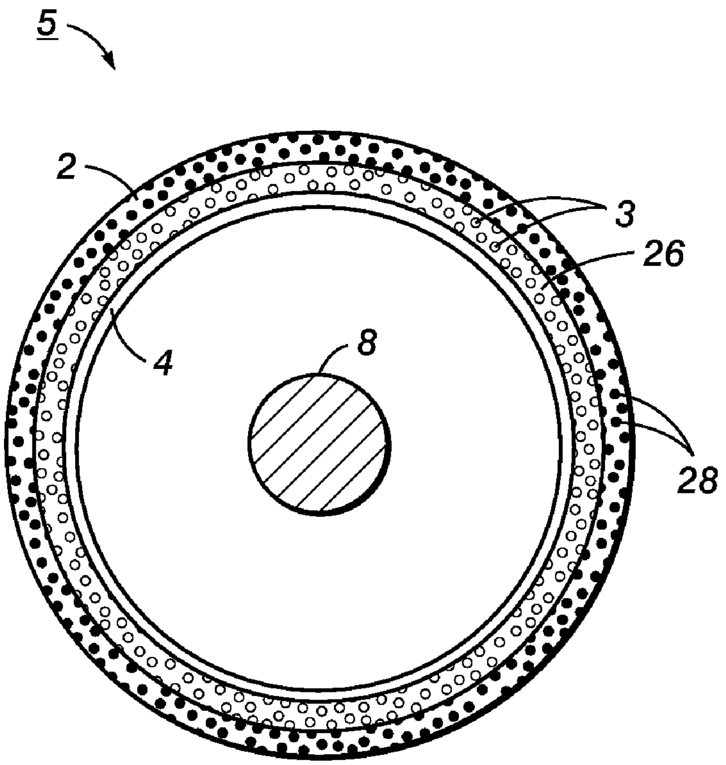
FIG. 3 is a sectional view of a fuser roller having a three-layer configuration.

FIG. 3 demonstrates a three-layer configuration, wherein fuser roller 5 has heating member 8 inside, and thereover substrate 4 and having intermediate layer 26 positioned on substrate 4, and outer layer 2 positioned on intermediate layer 26. FIG. 3 demonstrates optional fillers 3 and 28, which may be the same or different, and can be dispersed optionally in the intermediate layer 26, and/or optionally in the outer layer 2. There may be provided none, one, or more than one type of filler(s) in the layer(s).

Figure 4:
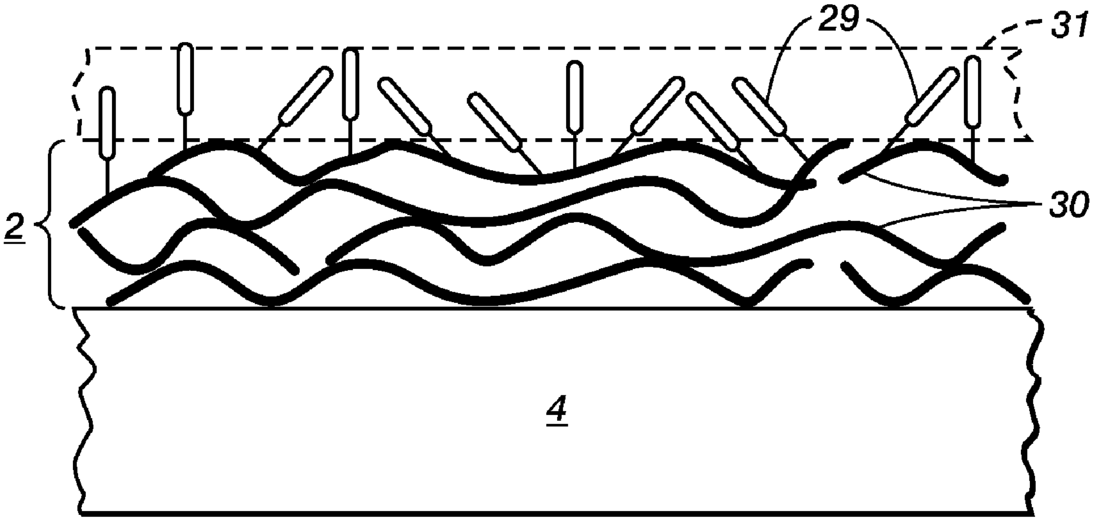
FIG. 4 is a side view illustration of the fluoropolymer material 30, with fluorocarbon chains 29 oriented at or near the surface 1 of polymer matrix outer layer 2.

FIG. 4 demonstrates an embodiment wherein the fuser member comprises an intermediate layer 4, having thereon outer layer 2 and topcoat 31. Outer layer 2 comprises fluoropolymer chains 30 therein. Topcoat 31 comprises fluorinated carbon chains 29 therein. The fluorinated carbon chains are oriented at or near the surface 1 of the topcoat.

In embodiments, the fuser member is self-releasing or partially self-releasing, requiring little or no release agent. If no release agent is required then no release agent sump and release agent donor member is used. Fluorocarbon chains are chemically bonded to a fluoropolymer material, and orient towards the surface of the polymer matrix layer, so that the exterior of the fuser layer is composed primarily of fluorinated carbon chains. The fluorinated carbon chains impart a high degree of fluorination at the fusing surface and facilitate release without the need for fusing oil or release agent. The topcoat, as such, is “self-releasing” if the surface facilitates the release of toner, toner additives, and other contaminants in contact with the fusing surface, without the use of fuser release oil. Fuser release oil normally comprises polydimethylsiloxane, or polydimethylsiloxane derivatives. Embodiments also include a fuser member that is partially self-releasing and requires the use of a minimal amount of fuser oil to meet required performance specifications at the fusing surface. In embodiments, reactive functionalities of fluorocarbon chains also self-crosslink by bonding with one another.

The fluorinated carbon chains forming the outer topcoat release layer can be fully fluorinated or semi-fluorinated. Fully fluorinated chains are entirely fluorinated carbon chains exempting one or more attached reactive functionalities. The fluorinated carbon chains attach to the polymeric chains of the surface of the fluoropolymer material directly via one or more reactive functionalities, or bind indirectly via reaction of a reactive end functionality with a linker group. The reactive functionality, in embodiments, can be siloxy functionality that bonds to corresponding siloxy functionality crosslinked into the fluoroelastomer material. The low surface energy of the fluorocarbon chains result in the outer fusing layer surface forming a highly fluorinated surface. A high degree of fluorination at the fusing surface is desirable for self-release, which is observed for fluoropolymer outer layers containing materials such as TEFLON® (PFA), or other TEFLON®-like fluoropolymers that possess a high degree of fluorination (where the F/C ratio approaches 2). The new material system described includes the incorporation of fluoroelastomers such as those sold under the tradename VITON® that provides desirable mechanical properties for fusing, and eliminates processing and robustness issues of using known fluoropolymers such as TEFLON® (PFA) as the outer layer.

In embodiments, the fluorocarbon chains are fluorinated along the entire chain, or partially fluorinated along the chain, excluding reactive functionalities present. Therefore, the fluorocarbon chain is either fully fluorinated (fluorinated along the entire chain) or semi-fluorinated (fluorinated along a portion of the chain). The fluorocarbon chain is terminated with functional groups that react directly with the fluoroelastomer coating, or indirectly via a segment linking to the fluoroelastomer material such as a crosslinker. Examples of reactive functional groups attached to fluorocarbon chains include siloxy, amino, hydroxyl, phenylhydroxy, alkoxy, or acidic groups. Resulting linking functionalities formed via these reactive functional groups then include siloxane (—Si—O—Si—), amine (—NH—), ether (C—O—C), or ester (—COO—), and more specifically, the reactive functional groups are selected from the group consisting of

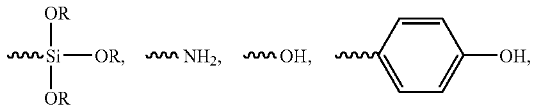

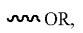

and

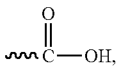

wherein R is an aliphatic chain having from about 1 to about 20 carbons, or from about 1 to about 10 carbons.

In embodiments, the outer layers comprise a fluorocarbon layer comprising reactive fluorocarbon chains bonded to the surface of a fluoroelastomer layer. Bonding at the fluorocarbon/fluoroelastomer interface may be described by the following general Formula I:

$$A\text{-}(C)_r\text{-}Q\text{-}B \qquad (I)$$

wherein A is a fluoropolymer, C is a crosslinker, Q is a reactive functionality attached to B, B includes fluorocarbon chains, and wherein r is 0 or 1.

Examples of fully fluorinated fluorocarbon chains B include any aliphatic or aromatic fluorocarbon that is attached to a reactive functionality Q, and examples include fluorocarbon chains having the following Formula II or Formula III:

$$CF_3(CF_2)_n\text{-}Q \qquad (II)$$

(III)

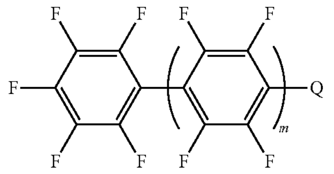

wherein n represents the number of fluorinated aliphatic repeating units, and is a number from about 0 or 1 to about 40, or from about 0 or 1 to about 20, or from about 0 or 1 to about 10; and m represents the number of fluorinated aromatic repeating units, and is a number from about 0 or 1 to about 20, or from about 0 or 1 to about 10, or from about 0 or 1 to about 5, and Q represents a reactive functionality.

Examples semi-fluorinated fluorocarbon chains B include partially fluorinated aliphatic or aromatic carbons that are attached to a reactive functionality Q, and examples include semi-fluorinated chains having the following Formula IV or Formula V:

$CF_3(CF_2)_n—(CH_2)_pQ$ (IV)

(V)

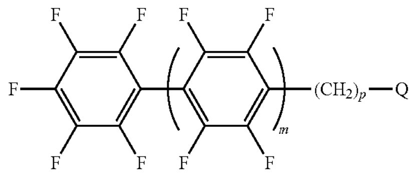

wherein n represents the number of fluorinated aliphatic repeating units, and is a number from about 0 or 1 to about 40, or from about 0 or 1 to about 20, or from about 0 or 1 to about 10; m represents the number of fluorinated aromatic repeating units, and is a number from about 0 or 1 to about 20, or from about 0 or 1 to about 10, or from about 0 or 1 to about 5; and p represents the number of hydrocarbon repeating units, and is a number from about 1 to about 10, or from about 2 to about 5, and Q represents a reactive functionality.

Examples of aliphatic fully fluorinated or semi-fluorinated fluorocarbon chains include those that contain unsaturated bonds, such as double or triple bonds, or branched chains along fluorinated or non-fluorinated portions of chains.

In embodiments, the fluorocarbon chains have a reactive functional group Q in the above Formula I. In embodiments, fluorocarbon chains comprise a fluorocarbon-containing segment and reactive functional groups, whereby the fluorocarbon-containing segment attaches to one or more reactive functional groups. Examples of suitable reactive functional groups include amino functional groups and siloxy functional groups. Specific examples of reactive functional groups include those having the following Formula VI, VII and Formula VIII:

$H_2N—CH_2—CH_2—$ (VI)

(VII)

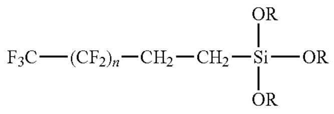

$(OR)_3—Si—$ (VIII)

wherein R is an aliphatic chain having from about 1 to about 20 carbons, or from about 1 to about 6 carbons, and wherein n represents the number of fluorinated aliphatic repeating units, and is a number from about 0 to about 40. In embodiments, R is selected from the group consisting of methyl, ethyl, propyl, butyl, isopropyl, or isobutyl.

In embodiments, the fluorocarbon chain B in the above Formula I is bonded to a fluoroelastomer layer material directly via a reactive functional group Q. An example of a reactive functional group Q that will bond directly with a fluoropolymer or fluoroelastomer is an amino functional group such as is in Formula VI.

In embodiments, the fluorocarbon chain B in the above Formula I is bonded to a fluoroelastomer layer material via reaction of functional group Q with a crosslinker C. Suitable crosslinkers C are bifunctional crosslinkers capable of binding both to fluoropolymer chains, and to a functional end group Q attached to fluorocarbon chains. Examples of suitable crosslinkers include siloxane crosslinkers such as bisphenol A (BPA) siloxane crosslinker and aminosiloxane crosslinker such as AO700 (aminoethyl aminopropyl trimethoxysilane crosslinker from Gelest). Examples of BPA siloxane crosslinkers include those having the following Formula IX, and examples of aminosiloxane crosslinkers include those having the following Formula X:

(IX)

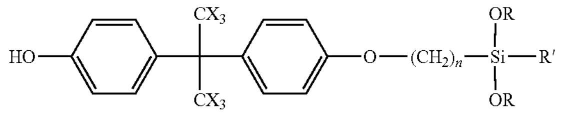

X = H, F (X)

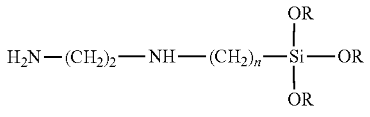

wherein X is hydrogen or fluorine, and wherein R and R' are aliphatic chains having from about 1 to about 20 carbons, or from about 1 to about 6 carbons, and wherein n is a number of from about 1 to about 10, or from about 1 to about 5, or from about 3 to about 4. In embodiments, R is selected from the group consisting of methyl, ethyl, propyl, butyl, isopropyl, or isobutyl. In embodiments, R' is an alkoxy having from about 1 to about 20 carbons, or from about 1 to about 6 carbons.

Siloxane-containing crosslinkers can become grafted within a fluoropolymer layer material via functionalities such as bisphenol-A or amine that react with the fluoropolymer. Fluorocarbon chains modified with siloxy functionalities can be deposited as an outer layer over the fluoropolymer/crosslinker layer, and subsequent curing will crosslink siloxane groups via condensation to produce siloxane-siloxane (Si—O—Si) linkages and bind the fluoropolymer and fluo rocarbon layers together. A more specific description of crosslinking, layer by layer, describes siloxane-siloxane linkages forming within the fluoropolymer layer to crosslink polymer chains, siloxane-siloxane linkages formed within the fluorocarbon layer to crosslink fluorocarbon chains, and siloxane-siloxane linkages formed at the fluoropolymer layer/fluorocarbon layer interface crosslink the two layers together.

Figure 5:
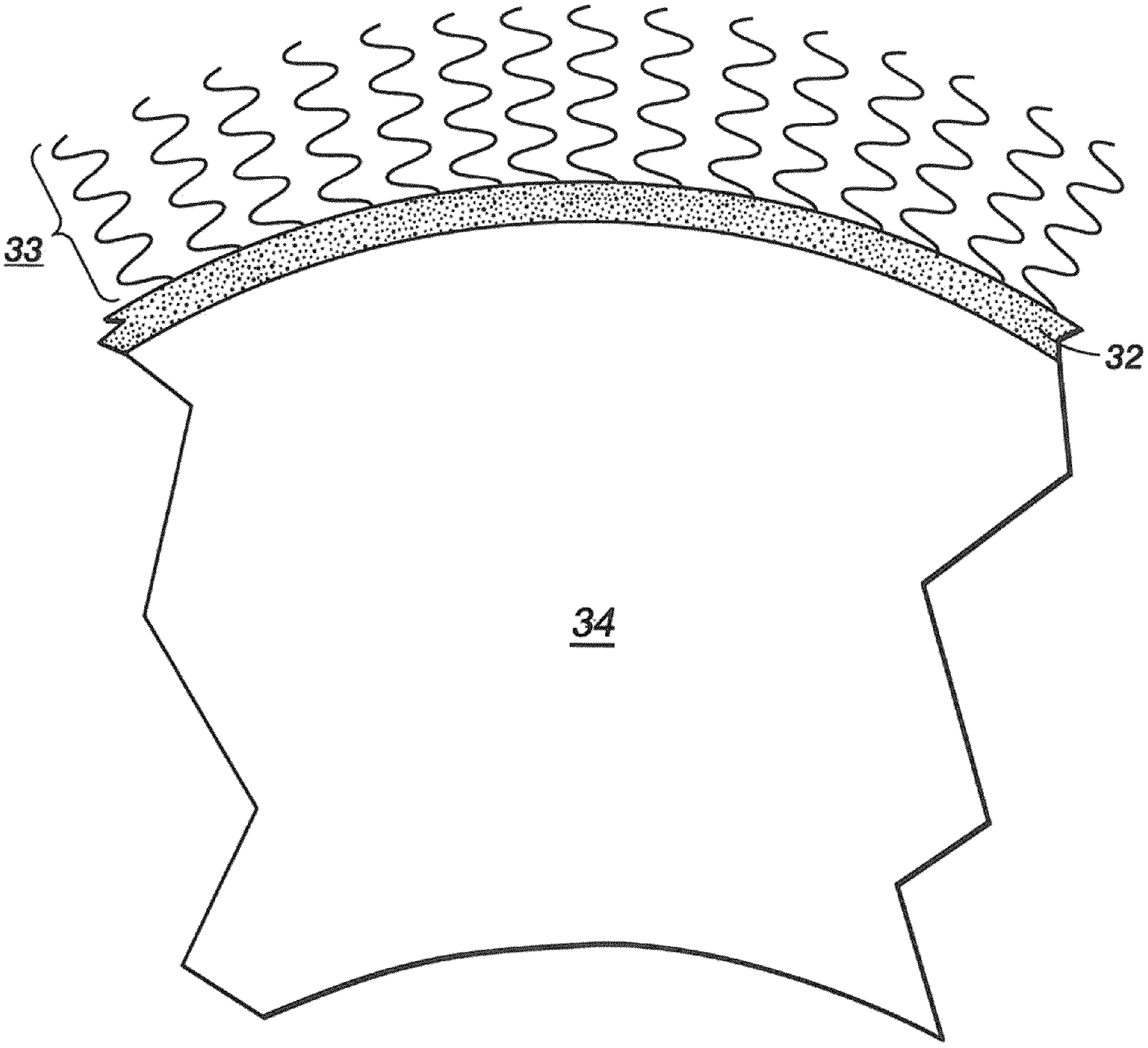
FIG. 5 is an illustration showing a fluoropolymer material 34, an interface layer where crosslinking occurs 32, and outer fluorocarbon chains 33.

In embodiments, a crosslinker layer may be added separately as an additional adhesive layer. Crosslinking and curing may be carried out simultaneously for all layers, or stepwise layer by layer. The depiction in FIG. 5 shows a fluoropolymer layer material 34, an interface layer where crosslinking occurs 32, and outer fluorocarbon chains 33. Fluorocarbon chains 33 of the topcoat layer may preferentially orient towards the surface, to increase the fluorine content over the outer fluoropolymer layer as shown in FIG. 5.

A proposed example incorporating BPA-siloxane crosslinker into the fluoropolymer layer and attaching siloxyfluorocarbon chains is shown in the schematic below. BPA-siloxane is grafted to fluoropolymer (such as a fluoroelastomer) chains prior to deposition to form a fluoropolymer layer. Siloxyfluorocarbon chains are then added as an overcoat layer. Siloxane-siloxane linkages subsequently form during curing to crosslink fluoropolymer chains and bind siloxyfluorocarbon chains. Siloxyfluorocarbon chains also self-condense via siloxane-siloxane linkages to form a securely self-bound and surface-bound overcoat layer.

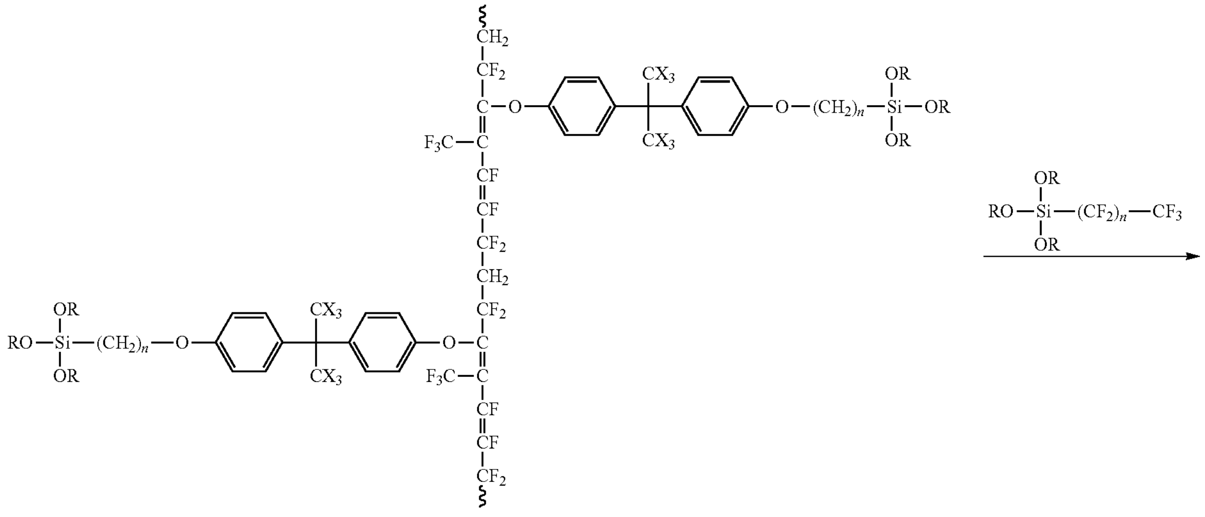

Siloxane Functionalized Fluoropolymer

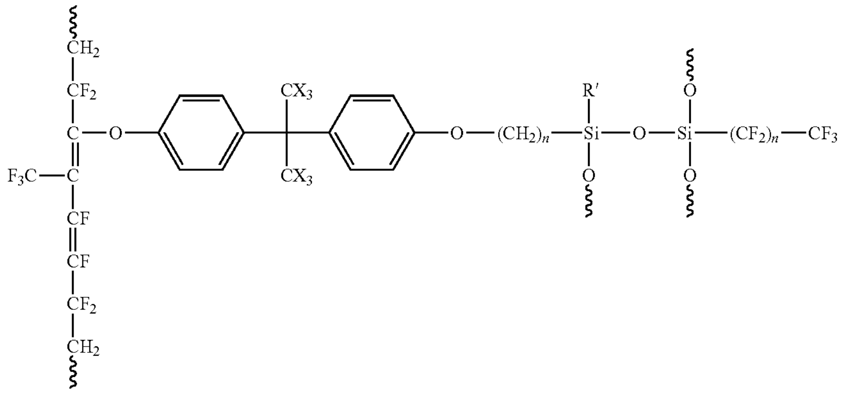

Fluoroalkyl Chain Bound to Fluoropolymer via Siloxane Linkages wherein in the above formulas, X is fluorine or hydrogen, and wherein R and R' are an aliphatic chain having from about 1 to about 20 carbons, or from about 1 to about 6 carbons. In embodiments, R is selected from the group consisting of methyl, ethyl, propyl, butyl, isopropyl, or isobutyl; and wherein n is a number of from about 1 to about 10, or from about 1 to about 5, or from about 3 to about 4. In embodiments, R' is an alkoxy group having from about 1 to about 20 carbons, or from about 1 to about 6 carbons.

Examples of suitable fluorinated polymer layer materials (A in Formula I) include fluoropolymer and fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein, these elastomers are from the class of 1) copolymers of vinylidenefluoride and hexafluoropropylene (known commercially as VITON® A), or two of vinylidenefluoride, hexafluoropropylene and tetrafluoroethylene; 2) terpolymers of vinylidenefluoride, hexafluoropropylene and tetrafluoroethylene (known commercially as VITON® B); and 3) tetrapolymers of vinylidenefluoride, hexafluoropropylene, tetrafluoroethylene and cure site monomer (known commercially as VITON® GH and VITON® GF). Examples of commercially available fluoroelastomers include those sold under various designations such as VITON® A, VITON® B, VITON® E, VITON® E60C, VITON® E430, VITON® 910, VITON® GH; VITON® GF; and VITON® ETP. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer. These listed are commercially available from DuPont. The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene with about 2 weight percent cure site monomer.

Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of other fluoropolymers include fluoroplastics or fluoropolymers such as polytetrafluoroethylene, fluorinated ethylene propylene resin, perfluoroalkoxy (PFA), and other TEFLON®-like materials, and polymers thereof.

The amount of fluoroelastomer in solution for the fluoropolymer layer, in weight percent of total solids, is from about 10 to about 25 percent, or from about 16 to about 22 percent by weight of total solids. Total solids as used herein include the amount of polymer, dehydrofluorinating agent (if present) and optional adjuvants, additives, and fillers. The amount of fluorocarbon chains present as a liquid in solution to form the outer layer is from about 1 to about 100 weight percent of the solution, or from about 20 to about 50 weight percent of the solution.

The thickness of the outer polymeric surface layers of the fuser member herein, including fluoropolymer layer, optional crosslinker layer, and fluorocarbon outer layer, is from about 10 to about 100 micrometers, or from about 15 to about 35 micrometers.

Optional intermediate adhesive layers and/or intermediate polymer or elastomer layers may be applied to achieve desired properties and performance objectives of the present invention. The intermediate layer may be present between the substrate and the outer polymeric layers. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer may be bonded to the substrate via an adhesive layer.

The thickness of the intermediate layer is from about 0.5 to about 20 mm, or from about 1 to about 5 mm.

Other fillers may be present in the outer fusing layer and/or included in the intermediate layer. Fillers include metals and metal alloys, metal oxides, polymer fillers, carbon fillers, and the like, and mixtures thereof. Examples of metal oxides include copper oxide, alumina, silica, magnesium oxide, zinc oxide, tin oxide, indium oxide, indium tin oxide, and the like, and mixtures thereof. Examples of polymer fillers include polyanilines, polyacetylenes, polyphenelenes polypyrroles, polytetrafluoroethylene, and the like, and mixtures thereof. Examples of suitable carbon fillers include carbon black, carbon nanotubes, fluorinated carbon black, graphite and the like, and mixtures thereof. The term "electrically conductive particulate fillers" refers to the fillers which have intrinsic electrical conductivity.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

The outer material composition can be coated on the substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, and the like. In an embodiment, the aliphatic material coating is spray or flow coated to the substrate. Details of the flow coating procedure can be found in U.S. Pat. No. 5,945,223, the disclosure of which is hereby incorporated by reference in its entirety.

In an embodiment, the outer layer may be modified by any known technique such as sanding, polishing, grinding, blasting, coating, or the like. In embodiments, the outer fluoropolymer matrix layer has a surface roughness of from about 0.02 to about 1.5 micrometers, or from about 0.3 to about 0.8 micrometers.

The following Examples further define and describe embodiments herein. Unless otherwise indicated, all parts and percentages are by weight.

EXAMPLES

Example 1

Perfluorooctylsiloxane Coating Over Fluoroelastomer with Aminosiloxane Crosslinker A fluoropolymer dispersion was prepared containing 17 weight percent solids VITON®-GF fluoroelastomer dissolved in methyl isobutylketone (MIBK) and combined with 5 pph (parts per hundred versus weight of VITON®-GF) AO700 crosslinker (aminoethyl aminopropyl trimethoxysilane crosslinker from Gelest) and 24 pph Methanol. The dispersion was coated onto a test aluminum substrate with a barcoater and the coating was left to dry in air, forming a 25-30 μm fluoroelastomer layer. Following drying, the coating surface was overcoated with a solution of 50 weight percent of perfluorooctylsiloxane (tridecafluoro-1,1,2,2-tetrahydro-octyl-1-triethoxysilane from United Chemical Technologies) that formed a thin, <2 μm coating over the fluoroelastomer layer. The coating composition was subsequently cured via stepwise heat treatment over 24 hours at temperatures between 49° C. and 218° C. The resulting coating was robust to scarring when MIBK was applied and the surface was scratched with a metal implement.

Example 2

Perfluorooctylsiloxane Coating Over Fluoroelastomer with BPA-Siloxane Crosslinker It is expected that a two-layer coating could be prepared from perfluorooctylsilane chains and VITON®-GF, combined with a BPA-siloxane crosslinker. A solution of 2.0 parts of VITON®-GF would be dissolved into 75 parts of methylisobutylketone (MIBK) by dissolution over 18 hours at room temperature. Then, 0.031 part of MgO and 0.021 part of $Ca(OH)_2$ would be mixed in 25 parts of MIBK, sonicated to disperse the oxides, and this mixture would be added to the solution. Then 0.362 parts of silane crosslinker, bisphenol-AF-propylmethyldiisopropoxysilane (see Formula IX, where X=F, n=3, R=$CH(CH_3)_2$, R'=$CH_3$), and 0.028 parts of triphenylbenzylphosphonium chloride would be subsequently added and the suspended mixture stirred at reflux temperature for about 20 hours. The mixture would be filtered to remove suspended oxide particles, and the filtrate is added dropwise into an excess of isopropanol to precipitate silane-grafted fluoropolymer. Excess silane crosslinker (un-reacted organic graft) and side-products would be removed by successively washing with isopropanol and decanting the solution from the polymer. The siloxane-grafted fluoropolymer product would be precipitated from isopropanol, redissolved in MIBK and stored at an estimated solids loading of 17.5% (w/w).

The dispersion would then be deposited onto a substrate such as silicon, aluminum, glass, or another heat-resistant substrate with a bar-coater, flow-coater, or other suitable coating method and the coating left to dry in air, forming a 25-30 μm fluoroelastomer layer. Following drying, the coating surface would be overcoated with a solution of 50 weight percent of perfluorooctylsiloxane (tridecafluoro-1,1,2,2-tetrahydro-octyl-1-triethoxysilane from United Chemical Technologies) to form a thin, <2 μm coating over the fluoroelastomer layer.

Coatings would be subsequently cured via stepwise heat treatment over 24 hours at temperatures between 49° C. and 218° C. Perfluorooctylsiloxane chains are expected to crosslink to grafted BPA-siloxane chains and therefore crosslink into the fluoropolymer matrix.

Example 3

Perfluoroalkylamine Coating Over Fluoroelastomer Crosslinked with Aminosiloxane Crosslinker It is expected that a two-layer coating could be prepared from perfluoroalkylamine chains and VITON®-GF, combined with an aminosiloxane crosslinker. A fluoropolymer dispersion would be prepared containing 17 weight percent solids VITON®-GF fluoroelastomer dissolved in methyl isobutylketone (MIBK) over 18 hours at room temperature and combined with 5 pph (parts per hundred versus weight of VITON®-GF) AO700 crosslinker (aminoethyl aminopropyl trimethoxysilane crosslinker from Gelest), The dispersion would be deposited onto a substrate such as silicon, aluminum, glass, or another heat-resistant substrate with a bar-coater, flowcoater, or other suitable coating technique and the coating left to dry in air, forming a 25-30 μm fluoroelastomer layer. Following drying, the coating surface would be overcoated with a solution of 50 weight percent of perfluoroalkylamine to form a thin, <2 μm coating over the fluoroelastomer layer. Coatings would be subsequently cured via stepwise heat treatment over 24 hours at temperatures between 49° C. and 218° C. It is expected that perfluoroalkylamine would bind directly to fluoropolymer chains via amino linkages, while AO700 crosslinker binds directly to fluoropolymer chains via amino linkages as well as binds the composite system together via condensation followed by formation of siloxane-siloxane linkages.

Example 4

Perfluoroalkylamine Coating Over Fluoroelastomer Crosslinked with Bisphenol-AF Crosslinker It is expected that a two-layer coating could be prepared from perfluoroalkylamine chains and VITON®-GF, combined with a bisphenol-AF crosslinker. VITON®-GF would be dissolved in a mixture of methylethylketone and methylisobutyl ketone, and mixed with 7 pph by weight VC50 crosslinker (bisphenol-AF crosslinker from DuPont), 1.5 pph by weight magnesium oxide (ElastoMag 170 Special available from Rohm and Hass, Andover, Mass.), 0.75 pph by weight calcium hydroxide, 0.75 pph by weight carbon black (N990 available from R. T. Vanderbilt Co.), 0.489 pph by weight Novec® FC-4430 (available from 3M) and 0.86 pph by weight AKF-290 (available by Wacker). The total solids loading in solution would be 17.5 percent.

A coating formulation would be deposited onto a substrate such as silicon, aluminum, glass, or another heat-resistant substrate and dried in air. Following drying, the coating surface would be overcoated with a solution of 50 weight percent of perfluoroalkylamine to form a thin, <2 μm coating over the fluoroelastomer layer.

The coating composition would be crosslinked and cured by stepwise heating in air at temperatures between 149° C. and 232° C. for between 4 to 12 hours. It is expected that perfluoroalkylamine would bind directly to fluoropolymer chains via amino linkages, while VC50 crosslinker directly crosslinks fluoropolymer chains.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A self-releasing fuser member comprising a substrate, and thereover, an outer layer having a topcoat, wherein said outer layer comprises a fluoropolymer, wherein said topcoat comprises fluorocarbon chains, wherein said fluorocarbon chains are bonded to said fluoropolymer of the outlayer via a crosslinker such that the fluorocarbon chains are oriented so that an exterior surface of the self-releasing fuser member comprises primarily fluorinated carbon chains, and wherein said fluorocarbon chains comprise a fluorocarbon-containing segment and one or more reactive functional groups.

2. A self-releasing fuser member in accordance with claim 1, wherein the fuser member requires little or no fusing oil for release.

3. A self-releasing fuser member in accordance with claim 1, wherein said reactive functional groups are selected from the group consisting of siloxy, amino, hydroxyl, phenylhydroxy, alkoxy, and acidic groups.

4. A self-releasing fuser member in accordance with claim 3, wherein said reactive functional groups are selected from the group consisting of

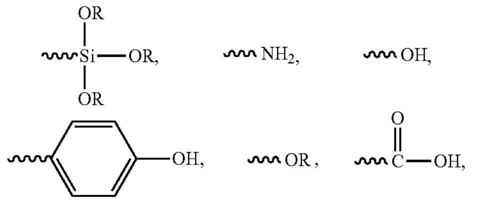

wherein R is an aliphatic chain having from about 1 to about 20 carbons.

5. A self-releasing fuser member in accordance with claim 1, wherein said fluorocarbon chains are fully fluorinated.

6. A self-releasing fuser member in accordance with claim 5, wherein said fully fluorinated fluorocarbon chains are selected from the group consisting of Formula II and Formula III:

$CF_3(CF_2)_n$-Q (II)

(III)

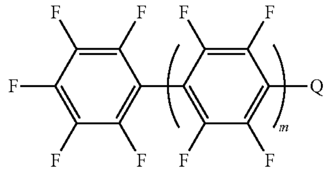

wherein n represents the number of fluorinated aliphatic repeating units, and is a number from about 0 to about 40; and m represents the number of fluorinated aromatic repeating units, and is a number from about 0 to about 20, and Q represents a reactive functionality.

7. A self-releasing fuser member in accordance with claim 1, wherein said fluorocarbon chains are semi-fluorinated.

8. A self-releasing fuser member in accordance with claim 7, wherein said semi-fluorinated fluorocarbon chains are selected from the group consisting of Formula IV and Formula V:

$CF_3(CF_2)_n$—$(CH_2)_p$Q (IV)

(V)

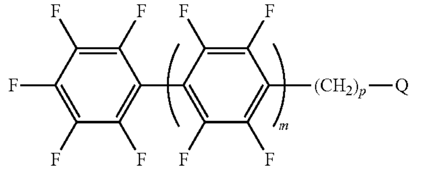

wherein n represents the number of fluorinated aliphatic repeating units, and is a number from about 0 to about 40; m represents the number of fluorinated aromatic repeating units, and is a number from about 0 to about 20; and p represents the number of hydrocarbon repeating units, and is a number from about 1 to about 10, and Q represents a reactive functionality.

9. A self-releasing fuser member in accordance with claim 8, wherein said semi-fluorinated chains are siloxane-terminated chains having the following Formula VII:

(VII)

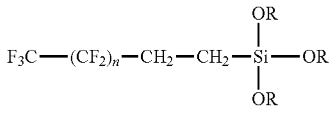

wherein n represents the number of fluorinated aliphatic repeating units, and is a number from about 0 to about 40; and R is an aliphatic chain having from about 1 to about 20 carbons.

10. A self-releasing fuser member in accordance with claim 1, wherein said fluoropolymer material is a fluoroelastomer selected from the group consisting of a) copolymers of two of vinylidenefluoride, hexafluoropropylene and tetrafluoroethylene; b) terpolymers of vinylidenefluoride, hexafluoropropylene and tetrafluoroethylene; and c) tetrapolymers of vinylidenefluoride, hexafluoropropylene, tetrafluoroethylene and a cure site monomer.

11. A self-releasing fuser member in accordance with claim 10, wherein said fluoroelastomer is a tetrapolymer of vinylidenefluoride, hexafluoropropylene, tetrafluoroethylene and a cure site monomer.

12. A self-releasing fuser member in accordance with claim 1, wherein said fluoropolymer material is selected from the group consisting of perfluoroalkoxy, polytetrafluoroethylene, and fluorinated ethylene propylene resin.

13. A self-releasing fuser member in accordance with claim 12, wherein said fluoropolymer material is perfluoroalkoxy.

14. A self-releasing fuser member in accordance with claim 1, wherein said fluorocarbon chains are bonded to said fluoropolymer material via a crosslinker.

15. A self-releasing fuser member in accordance with claim 14, wherein said crosslinker comprises a siloxane-containing crosslinker.

16. A self-releasing fuser member in accordance with claim 15, wherein said siloxane-containing crosslinker is selected from the group consisting of Formula VIII and Formula IX:

(IX)

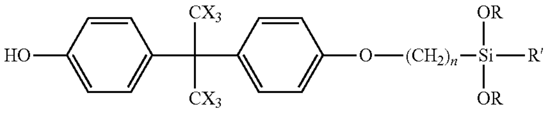

(X)

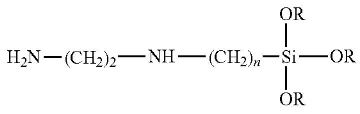

X = H, F wherein X is selected from the group consisting of hydrogen and fluorine, R is an aliphatic chain having from about 1 to about 20 carbons, R' is selected from the group consisting of aliphatic chain having from about 1 to about 20 carbons, and alkoxy group having from about 1 to about 20 carbons, and n is a number of from about 1 to about 10.

17. An oil-less image forming apparatus for forming images on a recording medium comprising a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a self-releasing fuser member for fusing said developed image to a copy substrate, wherein said self-releasing fuser member comprises a substrate, and thereover, an outer layer having a topcoat, wherein said outer layer comprises a fluoropolymer and wherein said topcoat comprises fluorocarbon chains, wherein said fluorocarbon chains are bonded to said fluoropolymer of the outlayer such that the fluorocarbon chains are oriented so that an exterior surface of the self-releasing fuser member comprises primarily fluorinated carbon chains, wherein said fluorocarbon chains comprise a fluorocarbon-containing segment and one or more reactive functional groups, whereby said fluorocarbon-containing segment attaches to one or more reactive functional groups.

* * * * *